US012280938B2

United States Patent
Ma et al.

(10) Patent No.: US 12,280,938 B2
(45) Date of Patent: Apr. 22, 2025

(54) PACKAGING BOX

(71) Applicant: INTERCONTINENTAL GREAT BRANDS LLC, East Hanover, NJ (US)

(72) Inventors: Li Ma, JiangSu (CN); Marco Antonio Isasis Celis, Singapore (SG)

(73) Assignee: INTERCONTINENTAL GREAT BRANDS LLC, East Hanover, NJ (US)

( * ) Notice: Subject to any disclaimer, the term of this patent is extended or adjusted under 35 U.S.C. 154(b) by 0 days.

(21) Appl. No.: 17/928,811

(22) PCT Filed: Jul. 27, 2021

(86) PCT No.: PCT/US2021/043268
§ 371 (c)(1),
(2) Date: Nov. 30, 2022

(87) PCT Pub. No.: WO2022/026437
PCT Pub. Date: Feb. 3, 2022

(65) Prior Publication Data
US 2023/0227238 A1    Jul. 20, 2023

(30) Foreign Application Priority Data
Jul. 29, 2020    (CN) .......................... 202021538976.1

(51) Int. Cl.
B65D 83/04    (2006.01)
B65D 25/04    (2006.01)

(52) U.S. Cl.
CPC ......... *B65D 83/0481* (2013.01); *B65D 25/04* (2013.01)

(58) Field of Classification Search
CPC .... B65D 83/048; B65D 25/04; B65D 11/188; B65D 25/525
(Continued)

(56) References Cited

U.S. PATENT DOCUMENTS 3,441,165 A  *  4/1969  Vincenzo ............... B65D 83/02
                                                      220/784
4,230,237 A  *  10/1980  de Wit ............... B65D 83/0409
                                                      206/534.2
(Continued)

FOREIGN PATENT DOCUMENTS

JP    H09201400 A    8/1997
JP    H09202368 A    8/1997
(Continued)

OTHER PUBLICATIONS

PCT International Search Report (ISR); International Application No. PCT/US2021/043268; International Filing Date: Jul. 27, 2021; Date of Mailing: Oct. 20, 2021; pp. 1-4.
(Continued)

*Primary Examiner* — Ernesto A Grano
(74) *Attorney, Agent, or Firm* — CANTOR COLBURN LLP

(57) ABSTRACT

The present utility model relates to a packaging box. The packaging box includes: an upper cover; and a lower cover. The upper cover and the lower cover can be combined together to form an internal packaging space therebetween. The packaging box further includes at least one spacer provided in the interior of at least one of the upper cover and the lower cover. When the upper cover and the lower cover are combined, the spacer divides the internal packaging space into at least a left cavity and a right cavity. The left cavity and the right cavity have a left outlet and a right outlet, respectively, and at least one of the upper cover and the lower cover is provided with at least one flip cover. The at least one flip cover can be flipped vertically to close or open the left outlet and/or the right outlet. In the present utility model, various types of blocks can be stored in one packaging box and easily accessed by a consumer with one
(Continued)

hand, thereby greatly improving user experience of the consumer.

21 Claims, 4 Drawing Sheets

(58) Field of Classification Search
USPC .......................................................... 206/540
See application file for complete search history.

(56) References Cited

U.S. PATENT DOCUMENTS

| | | | | |
|---|---|---|---|---|
| 4,555,043 A * | 11/1985 | Bernhardt | .......... | B65D 43/0218 |
| | | | | 220/257.1 |
| 5,513,774 A * | 5/1996 | Dominquez | ....... | B65D 83/0409 |
| | | | | 221/268 |
| 5,878,887 A | 3/1999 | Parker et al. | | |
| 5,931,302 A * | 8/1999 | Isaacs | ................ | B65D 83/0409 |
| | | | | 206/538 |
| 5,947,294 A | 9/1999 | Omata et al. | | |
| 6,247,595 B1 * | 6/2001 | Omata | ................... | A45C 11/24 |
| | | | | 220/837 |
| 6,530,505 B1 * | 3/2003 | Barnes | ................... | B65D 47/20 |
| | | | | 222/516 |
| 6,561,379 B1 * | 5/2003 | Goh | .......................... | A61J 1/03 |
| | | | | 221/90 |
| D496,271 S * | 9/2004 | Hoeltgen | ....................... | D9/423 |
| 7,066,349 B2 * | 6/2006 | Cohen | ................ | B65D 83/0481 |
| | | | | 221/92 |
| 7,159,720 B2 * | 1/2007 | Pearson | ................ | B65D 83/04 |
| | | | | 206/533 |
| D546,670 S * | 7/2007 | Sainz | ............................. | D9/420 |
| D547,645 S * | 7/2007 | Sainz | ............................. | D9/420 |
| 8,006,860 B2 * | 8/2011 | Klein | ................ | B65D 77/0473 |
| | | | | 206/800 |
| D693,999 S * | 11/2013 | Alexander | ................. | D3/203.2 |
| 9,010,570 B2 * | 4/2015 | Gelardi | ................. | B65D 85/10 |
| | | | | 221/256 |
| 11,597,568 B2 * | 3/2023 | Pastrana | ............. | B65D 43/162 |
| 2002/0066690 A1 | 6/2002 | Mattis et al. | | |
| 2003/0159965 A1 * | 8/2003 | Baker | ................... | B65D 83/04 |
| | | | | 206/540 |
| 2003/0230514 A1 * | 12/2003 | Baker | ................... | B65D 51/245 |
| | | | | 206/39 |
| 2004/0004083 A1 * | 1/2004 | Grant | ................. | B65D 83/0409 |
| | | | | 221/185 |
| 2004/0094566 A1 * | 5/2004 | Renaud | .............. | B65D 83/0409 |
| | | | | 221/266 |
| 2004/0182877 A1 * | 9/2004 | Oroumieh | ............... | A47G 21/12 |
| | | | | 221/92 |
| 2007/0289985 A1 * | 12/2007 | Bieger | ............... | B65D 83/0481 |
| | | | | 221/24 |
| 2008/0223872 A1 * | 9/2008 | Kramer | ................... | G07F 11/16 |
| | | | | 221/265 |
| 2009/0151115 A1 * | 6/2009 | Klein | ................. | B65D 77/0473 |
| | | | | 16/221 |
| 2021/0300641 A1 * | 9/2021 | Pastrana | ................ | B65D 50/06 |
| 2022/0048693 A1 * | 2/2022 | Shimek | .................. | B65D 83/04 |

FOREIGN PATENT DOCUMENTS

| | | | |
|---|---|---|---|
| JP | 2000313428 A | | 11/2000 |
| JP | 2001151286 A | | 6/2001 |
| JP | 2001315865 A | | 11/2001 |
| JP | 2003192074 A | | 7/2003 |
| JP | 2010052782 A | | 3/2010 |
| JP | 2011073712 A | | 4/2011 |
| WO | 2022026437 A1 | | 2/2022 |

OTHER PUBLICATIONS

PCT ISR—Written Opinion of the International Searching Authority; International Application No. PCT/US2021/043268; International Filing Date: Jul. 27, 2021; Date of Mailing: Oct. 20, 2021; pp. 1-8.

Japanese Office Action for Japanese Application No. 2023-501068; Report Mail Date Nov. 27, 2023 (13 Pages—with machine translation).

PCT International Preliminary Report on Patentability; International Application No. PCT/US2021/043268; International Filing Date: Jul. 27, 2021; Date of Mailing: Jan. 31, 2023; pp. 1-7.

Australian Office Action for Australian Application No. 2021318953; Report Mail Date Jan. 29, 2024 (3 Pages).

Examination Report issued in Australian Application No. 2021318953 dated Jun. 26, 2024.

Japanese Application No. 2024-27370; Office Action dated Feb. 3, 2025; 4 pages.

* cited by examiner

PACKAGING BOX

CROSS REFERENCE TO RELATED APPLICATIONS

This application is a National Stage application of PCT/US2021/043268, filed Jul. 27, 2021, which claims priority to Chinese Application No. 202021538976.1, filed Jul. 29, 2020, both of which are incorporated by reference in their entirety herein.

TECHNICAL FIELD

The present utility model relates to a packaging box, and in particular relates to a packaging box suitable for accommodating various types of blocks.

BACKGROUND

As the standard of living has continued to increase, people have higher packaging requirements for certain block-shaped food products or medicines (referred to as "blocks") that need to be consumed regularly. Various types of blocks are commercially available, and these blocks may have any shape, such as a cuboid shape, a spherical shape, an ellipsoidal shape, and an annular shape, or may be pellets having irregular shapes. A surface of the block may be smooth or non-smooth, for example, the surface has granules such as sugar. In addition, the block may be a hard block (for example, a chocolate block) or a soft block (for example, a soft candy).

Currently, commercially available packaging boxes for accommodating blocks, such as chewing gum packaging boxes, are relatively simple in design. Such a packaging box generally adopts a box body having a single cavity, and the box body is provided with a single outlet for accessing blocks. However, as an example, confectionery products are available in various types, and each type of confectionery products generally has a different flavor. If the packaging box is configured with a single cavity and a single outlet, if a consumer wants to taste different types of confectionery products or confectionery products having different flavors, the consumer needs to purchase multiple boxes of confectionery products, thereby resulting in inconvenience to the consumer. Furthermore, since a large number of products are purchased, it may be difficult to completely consume the products in a short time, and the products are prone to expire.

On the other hand, with regard to an existing packaging box for a confectionery product, it is generally difficult for a consumer to access the confectionery product by performing an operation on the packaging box with one hand, and it is also difficult to control the number of the confectionery products being accessed at a time. This is particularly troublesome for consumers in some use scenarios (such as during driving).

Therefore, it is necessary to provide a packaging box suitable for accommodating various types of blocks and facilitating access to the blocks so as to solve the above-mentioned problems.

SUMMARY

In order to solve the above-mentioned problems, the present utility model provides a packaging box. The packaging box comprises: an upper cover; and a lower cover, wherein the upper cover and the lower cover can be combined together to form an internal packaging space therebetween. The packaging box further comprises at least one spacer provided in the interior of at least one of the upper cover and the lower cover. When the upper cover and the lower cover are combined, the spacer divides the internal packaging space into at least a left cavity and a right cavity. The left cavity and the right cavity have a left outlet and a right outlet, respectively, and at least one of the upper cover and the lower cover is provided with at least one flip cover. The at least one flip cover can be flipped vertically to close or open the left outlet and/or the right outlet.

In some embodiments, the spacer may be a ridge provided at a position in the interior of at least one of the upper cover and the lower cover, and when the upper cover and the lower cover are combined, the ridge divides the internal packaging space into the left cavity and the right cavity.

In some embodiments, the packaging box may be a rectangular box, and the upper cover and the lower cover respectively have a pair of parallel long edges and a pair of parallel short edges perpendicular to the pair of parallel long edges.

In some embodiments, the spacer may be a straight ridge provided at a position in the interior of at least one of the upper cover and the lower cover; the ridge is parallel to the short edges; and when the upper cover and the lower cover are combined, the ridge divides the internal packaging space into the left cavity and the right cavity.

In some embodiments, the spacer may be a straight ridge provided at a middle position in the interior of at least one of the upper cover and the lower cover, and when the upper cover and the lower cover are combined, the ridge divides the internal packaging space into the left cavity and the right cavity having identical sizes.

Those skilled in the art could understand that, in other embodiments of the present utility model, specific implementation aspects of the packaging box can be adjusted according to actual requirements. For example, the packaging box may be a packaging box having other suitable shapes, comprising but not limited to a circular box, an elliptical box, a cylindrical box, etc., and the shape and the position of a spacer can also be flexibly configured according to actual requirements; and the present utility model is not limited thereto.

In some embodiments, a portion of a long edge on a side of the upper cover comprising an end of the ridge is provided with an upper notch, and a position on the lower cover corresponding to the upper notch of the upper cover is provided with a lower notch; when the upper cover and the lower cover are combined, the upper notch of the upper cover, the lower notch of the lower cover, and the ridge may together form the left outlet of the left cavity and the right outlet of the right cavity. Those skilled in the art could understand that, in other embodiments of the present utility model, the spacer may not serve as a portion forming the left outlet of the left cavity and the right outlet of the right cavity.

In some embodiments, the left outlet and the right outlet may have identical or different shapes.

In some embodiments, the left outlet and the right outlet may have identical or different sizes.

In some embodiments, the at least one flip cover may be one flip cover; the one flip cover simultaneously closes or opens the left outlet and the right outlet; and the one flip cover is provided on one of the upper cover and the lower cover.

In some embodiments, the at least one flip cover may comprise two flip covers; the two flip covers close or open the left outlet and the right outlet, respectively; and the two flip covers are provided on one of the upper cover and the lower cover or are provided on the upper cover and the lower cover, respectively.

In some embodiments, the at least one flip cover may be connected by a hinge to at least one of the upper cover and the lower cover. However, the present utility model is not limited to hinge connection, and any suitable connection method that can implement a connection between the flip cover and the cover can be adopted.

In some embodiments, a gradually inclined left guide rail extending from a left edge of the left outlet to a left short edge of one of the upper cover and the lower cover may be provided in the left cavity, and a gradually inclined right guide rail extending from a right edge of the right outlet to a right short edge of the one of the upper cover and the lower cover may be provided in the right cavity. The left guide rail and the right guide rail are used to guide blocks accommodated therein to the left outlet and the right outlet, respectively, so as to facilitate access to the blocks.

In some embodiments, either one of the left guide rail and the right guide rail may be provided on at least one of the upper cover and the lower cover.

In some embodiments, the lower cover, the spacer, the left guide rail, the right guide rail, and the flip cover may be integrally formed.

In some embodiments, the lower cover has a height greater than that of the upper cover.

In some embodiments, the left outlet and the right outlet may be adjacent to each other. Preferably, a distance between the left outlet and the right outlet is not greater than 1/10 of the length of a long edge of the packaging box. More preferably, a distance between the left outlet and the right outlet is not greater than 1/20 of the length of the long edge of the packaging box.

In some embodiments, the left outlet and the right outlet may be provided on a side of the packaging box. Preferably, the left outlet and the right outlet may be provided on the same side of the packaging box.

In some embodiments, the packaging box may be flat.

In some embodiments, an outer surface of at least one of the upper cover and the lower cover may be provided with a recess; a free end of the at least one flip cover may be provided with a protruding portion; and the protruding portion is configured to be engageable with a side of the recess such that the at least one flip cover closes the left outlet and the right outlet.

In some embodiments, a side edge of the upper cover may be provided with an upper dovetail structure; a side edge of the lower cover may be provided with a lower dovetail structure; and the upper dovetail structure and the lower dovetail structure are configured to be engageable with each other so as to combine the upper cover with the lower cover.

In some embodiments, one of the upper dovetail structure and the lower dovetail structure may be a protruding dovetail structure, and the other one of the upper dovetail structure and the lower dovetail structure may be a recessed dovetail structure.

According to the technical solutions of the present utility model, a spacer is provided in the packaging box, so that the internal packaging space of the packaging box is divided into a plurality of cavities, thereby allowing various types of blocks to be stored in one packaging box and greatly improving user experience of a consumer. Furthermore, a rounded corner of the lower cover of the packaging box is configured to be greater than a rounded corner of the upper cover of the packaging box, so that the consumer can easily hold the packaging box with one hand. Moreover, by means of the design allowing the flip cover to be flipped vertically, the consumer could easily access products in the packaging box with one hand, thereby expanding application scenarios of the packaging box.

BRIEF DESCRIPTION OF THE DRAWINGS

The present utility model can be better understood by referring to the illustration and description of embodiments of the present utility model, wherein in the accompanying drawings.

DETAILED DESCRIPTION

In the following description, for the purpose of explanation, numerous specific details are set forth in order to provide a comprehensive understanding of the present utility model. However, it is apparent to those skilled in the art that the present utility model may be implemented without these specific details. In other examples, well-known structures and devices are shown in block diagrams. In this regard, the illustrative exemplary embodiments presented herein are merely for the purpose of explanation, and are not intended to limit the present utility model. Therefore, the protection scope of the present utility model is not limited by the above specific embodiments, and is subject only to the scope of the appended claims.

Firstly, it should be noted that although the embodiments of the present utility model exemplarily describe a packaging box having a left cavity and a right cavity, those skilled in the art could understand that the number of cavities can vary with a change in the configuration of a spacer. For example, the number of cavities may be three, four, or more, and the present utility model is not limited thereto. In other words, those skilled in the art could flexibly configure the number, shapes, and positions of spacers according to actual use conditions so as to meet the requirement of storing various types of products.

Figure 1:
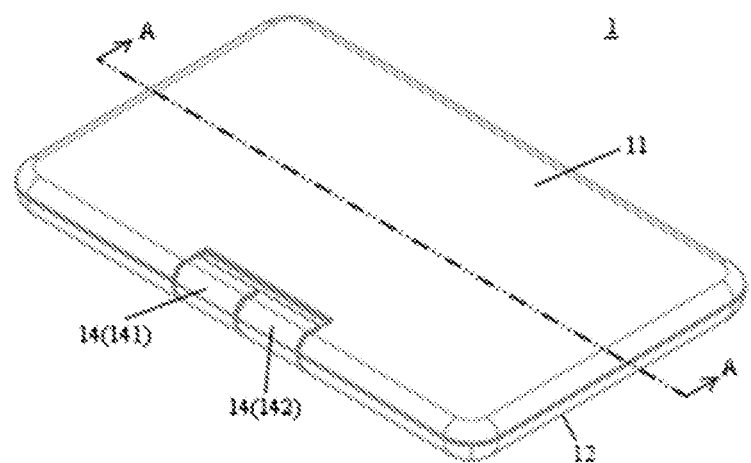
FIG. 1 is a perspective view of a packaging box according to an embodiment of the present utility model.
Figure 2:
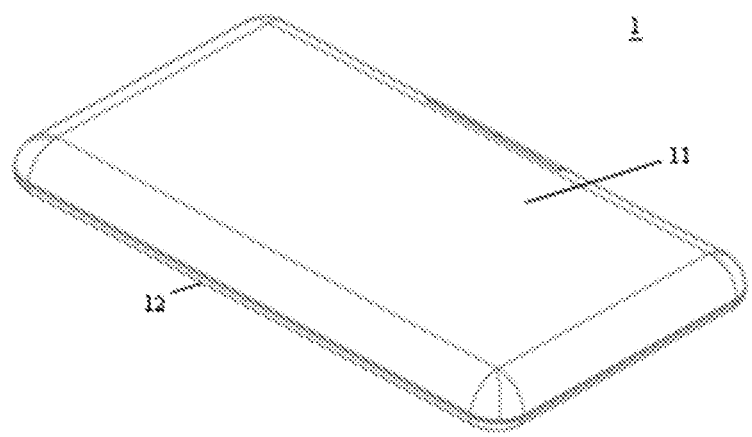
FIG. 2 is a perspective view of the packaging box viewed from another angle according to an embodiment of the present utility model.
Figure 3:
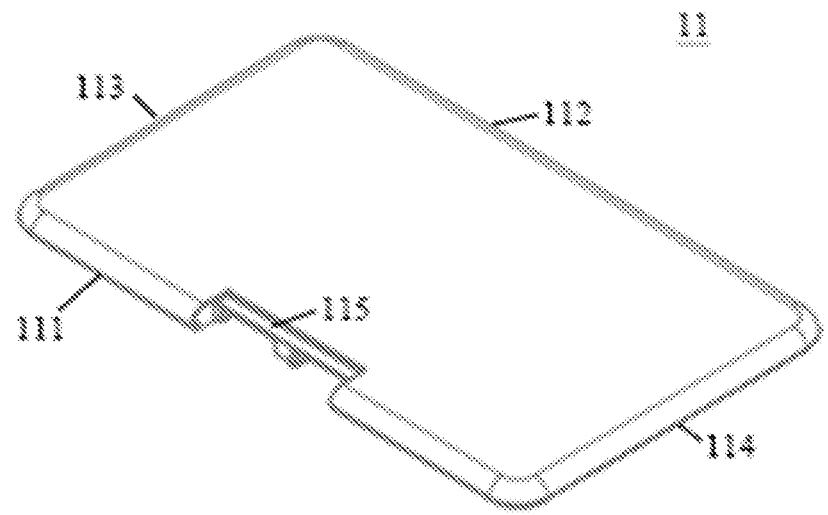
FIG. 3 is a perspective view of an upper cover of the packaging box according to the embodiment of the present utility model in FIG. 1.
Figure 4:
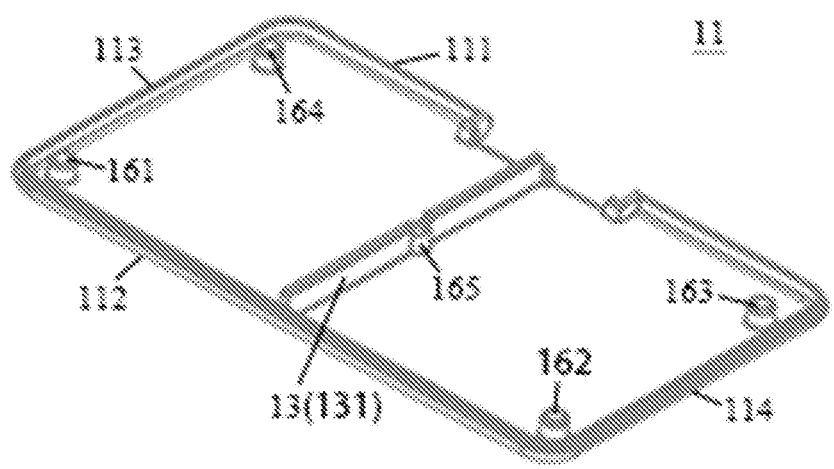
FIG. 4 is a perspective view of the upper cover of the packaging box viewed from another angle according to the embodiment of the present utility model in FIG. 1.
Figure 5:
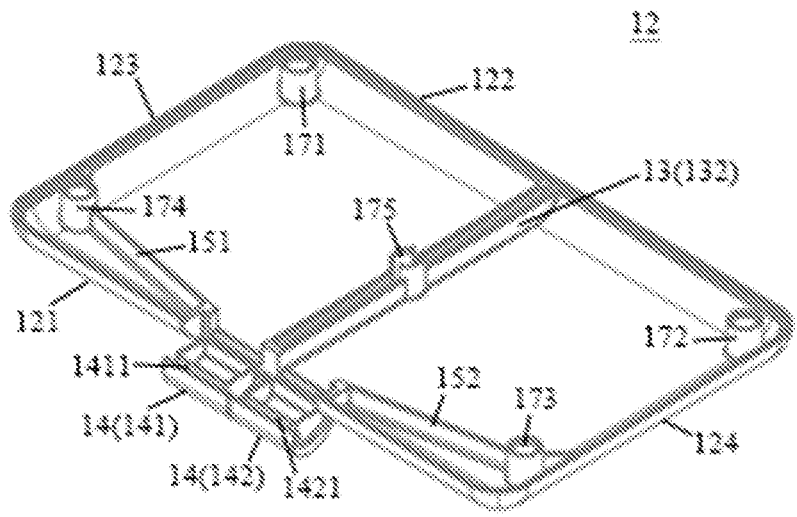
FIG. 5 is a perspective view of a lower cover of the packaging box according to the embodiment of the present utility model in FIG. 1.
Figure 6:
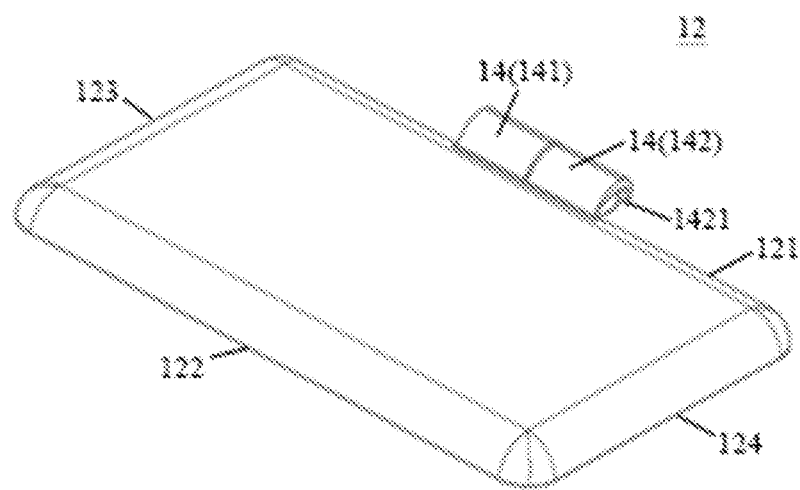
FIG. 6 is a perspective view of the lower cover of the packaging box viewed from another angle according to the embodiment of the present utility model in FIG. 1.

Please refer to FIG. 1 to FIG. 6. FIG. 1 is a perspective view of a packaging box according to an embodiment of the present utility model. FIG. 2 is a perspective view of the packaging box viewed from another angle according to an embodiment of the present utility model. FIG. 3 is a perspective view of an upper cover of the packaging box according to the embodiment of the present utility model in FIG. 1. FIG. 4 is a perspective view of the upper cover of the packaging box viewed from another angle according to the embodiment of the present utility model in FIG. 1. FIG. 5 is a perspective view of a lower cover of the packaging box according to the embodiment of the present utility model in FIG. 1. FIG. 6 is a perspective view of the lower cover of the packaging box viewed from another angle according to the embodiment of the present utility model in FIG. 1.

As shown in FIG. 1 and FIG. 2, a packaging box 1 according to an embodiment of the present utility model includes an upper cover 11 and a lower cover 12. The upper cover 11 and the lower cover 12 can be combined together to form, between the upper cover 11 and the lower cover 12, an internal packaging space for accommodating blocks. The packaging box 1 further includes at least one spacer 13 provided in the interior of at least one of the upper cover 11 and the lower cover 12. When the upper cover 11 and the lower cover 12 are combined, the spacer 13 can divide the internal packaging space into at least a left cavity and a right cavity. In the embodiment shown in FIG. 4 and FIG. 5, a spacer is provided in the interior of each of the upper cover 11 and the lower cover 12, that is, a spacer 131 is provided in the interior of the upper cover 11, and a spacer 132 is provided in the interior of the lower cover 12. However, those skilled in the art could understand that the spacers may be provided only on the upper cover or only on the lower cover as long as the internal packaging space can be divided, and the present utility model is not limited thereto.

In this embodiment, the left cavity and the right cavity have a left outlet and a right outlet, respectively, and at least one of the upper cover 11 and the lower cover 12 is provided with at least one flip cover 14. The at least one flip cover 14 can be flipped vertically to close or open the left outlet and/or the right outlet. As shown in FIG. 5, in this embodiment, the at least one flip cover 14 includes two flip covers. The two flip covers are a left flip cover 141 and a right flip cover 142. The left flip cover 141 and the right flip cover 142 are used to close or open the left outlet and the right outlet, respectively, and both the left flip cover 141 and the right flip cover 142 are provided on the lower cover 12. Similarly, those skilled in the art could understand that both the left flip cover 141 and the right flip cover 142 may be provided on the upper cover 11 or the left flip cover 141 and the right flip cover 142 may be provided on the upper cover 11 and the lower cover 12, respectively, as long as the left outlet and the right outlet can be closed or opened, and the present utility model is not limited thereto. In other embodiments not illustrated in the present utility model, the at least one flip cover 14 may be one flip cover, and the one flip cover may be provided on the upper cover 11 or the lower cover 12 and may simultaneously close or open the left outlet and the right outlet.

It should be noted that in this embodiment, the left flip cover 141 and the right flip cover 142 are connected by a hinge to the lower cover 12. However, the present utility model is not limited thereto, and any suitable connection method that can implement a connection between the flip cover and the cover falls within the protection scope of the present utility model. In addition, in this embodiment, description is provided on the basis that the left flip cover 141 and the right flip cover 142 have approximately identical configurations. However, those skilled in the art could understand that the left flip cover 141 and the right flip cover 142 may have slightly different configurations, and the present utility model is not limited thereto.

In the embodiment shown in FIG. 1 and FIG. 2, the packaging box 1 is shown as a flat rectangular box. Specifically, as shown in FIG. 3 and FIG. 4, the upper cover 11 has a pair of parallel long edges 111 and 112 and a pair of parallel short edges 113 and 114 perpendicular to the pair of parallel long edges 111 and 112. As shown in FIG. 5 and FIG. 6, the lower cover 12 has a pair of parallel long edges 121 and 122 and a pair of parallel short edges 123 and 124 perpendicular to the pair of parallel long edges 121 and 122. Certainly, those skilled in the art could understand that specific implementation aspects of the packaging box can be adjusted according to actual requirements. For example, the packaging box may be a packaging box having other suitable shapes, including but not limited to a circular box, an elliptical box, and a cylindrical box, and the packaging box may be non-flat; and the present utility model is not limited thereto.

Continue to refer to FIG. 3 to FIG. 6; in this embodiment, the spacer 131 is shown as a straight ridge parallel to the short edges 113 and 114, and is provided at a middle position in the interior of the upper cover 11. The spacer 132 is shown as a straight ridge parallel to the short edges 123 and 124, and is provided at a middle position in the interior of the lower cover 12. When the upper cover 11 and the lower cover 12 are combined, the spacer 131 and the spacer 132 are combined together to divide the internal packaging space into a left cavity and a right cavity having identical sizes. Similarly, those skilled in the art could understand that the shape and the position of a spacer can be flexibly configured according to actual requirements. In other embodiments not illustrated in the present utility model, the spacer may be a curved ridge, or may be a spacer piece having a reinforced structure, etc., and the present utility model is not limited thereto. In addition, in other embodiments not illustrated in the present utility model, the spacer may not be located in the middle position, so that the internal packaging space of the packaging box can be divided into a left cavity and a right cavity having different sizes. In this case, a manufacturer can pre-configure the size of the left cavity and the size of the right cavity according to purchasing preferences of consumers. A relatively large cavity can be used to accommodate products frequently purchased by the consumers, and a relatively small cavity can be used to accommodate products less frequently purchased by the consumers or a sample of a new product to be used, thereby further improving user experience of the consumer.

In the embodiments of the present utility model, as shown in FIG. 3 and FIG. 4, a portion of the long edge 111 on a side of the upper cover 11 including an end of the spacer 131 is provided with an upper notch. As shown in FIG. 5, a portion of the long edge 121 on a side of the lower cover 12 including an end of the spacer 132 is provided with a lower notch, and the position of the upper notch corresponds to the position of the lower notch. When the upper cover 11 and the lower cover 12 are combined, the upper notch of the upper cover 11, the lower notch of the lower cover 12, the spacer 131, and the spacer 132 together form the left outlet of the left cavity and the right outlet of the right cavity. In other embodiments not illustrated in the present utility model, the spacer may not serve as a portion forming the left outlet and the right outlet. That is, the upper cover 11 may be provided with a first upper notch at a position on the long edges 111 and 112 or the short edge 113 on a left side of the spacer 131, the lower cover 12 may be provided with a first lower notch at a position on the long edges 121 and 122 or the short edge 123 on a left side of the spacer 132, and the position of the first upper notch corresponds to the position of the first lower notch. Similarly, the upper cover 11 may be provided with a second upper notch at a position on the long edges 111 and 112 or the short edge 114 on a right side of the spacer 131, the lower cover 12 may be provided with a second lower notch at a position on the long edges 121 and 122 or the short edge 124 on a right side of the spacer 132, and the position of the second upper notch corresponds to the position of the second lower notch. When the upper cover 11 and the lower cover 12 are combined, the first upper notch of the upper cover 11 and the first lower notch of the lower cover 12 form the left outlet of the left cavity, and the second upper notch of the upper cover 11 and the second lower notch of the lower cover 12 form the right outlet of the right cavity.

In the embodiments shown in FIG. 1 to FIG. 6, description is provided on the basis that the left outlet and the right outlet have identical shapes and sizes. However, those skilled in the art could understand that the shape of the left outlet may be different from the shape of the right outlet, the size of the left outlet may also be different from the size of the right outlet, and the shapes and the sizes of the outlets can be flexibly configured according to the specific shapes and sizes of blocks accommodated therein, and the present utility model is not limited thereto. In the embodiments shown in FIG. 1 to FIG. 6, the left outlet and the right outlet are provided on the same side of the packaging box, and the left outlet and the right outlet are adjacent to each other, so that the consumer can easily open and close the left outlet and the right outlet by holding the packaging box with one hand. Preferably, a distance between the left outlet and the right outlet is not greater than 1/10 of the length of a long edge of the packaging box. More preferably, a distance between the left outlet and the right outlet is not greater than 1/20 of the length of the long edge of the packaging box. However, the present utility model is not limited thereto. In other embodiments not illustrated in the present utility model, for example, in a technical solution in which the spacer does not serve as a portion forming the left outlet and the right outlet, the left outlet and the right outlet may be provided on different sides of the packaging box, or may be not adjacent to each other.

According to the embodiments of the present utility model, as shown in FIG. 5, a free end of the left flip cover 141 has a protruding portion 1411, and a free end of the right flip cover 142 has a protruding portion 1421. As shown in FIG. 3, an outer surface of the upper cover 11 corresponding to the upper notch is provided with a recess 115, and the recess 115 has a length substantially identical to that of the upper notch. When the left flip cover 141 and the right flip cover 142 are closed, the protruding portion 1411 and the protruding portion 1421 may be engaged with a side of the recess 115 to form an appearance substantially consistent with that of a side wall portion of the packaging box. The width of the recess 115 may be designed to allow a finger to easily apply a force to open a flip cover.

In the embodiments of the present utility model, preferably, a gradually inclined left guide rail extending from a left edge of the left outlet to a left short edge of one of the upper cover and the lower cover is further provided in the left cavity, and a gradually inclined right guide rail extending from a right edge of the right outlet to a right short edge of the one of the upper cover and the lower cover is further provided in the right cavity. The left guide rail and the right guide rail are used to guide blocks accommodated therein to the left outlet and the right outlet, respectively, so as to facilitate access to the blocks. As shown in FIG. 5, in this embodiment, a gradually inclined left guide rail 151 extending from a left edge of the left outlet to a short edge 123 of a lower cover 12 is provided in the left cavity, and a gradually inclined right guide rail 152 extending from a right edge of the right outlet to a short edge 124 of a lower cover 12 is provided in the right cavity. In other embodiments not illustrated in the present utility model, the left guide rail or the right guide rail may also be provided on the upper cover, and the present utility model is not limited thereto. In addition, in the embodiment shown in FIG. 5, illustration and description is provided on the basis that the left guide rail and the right guide rail are in the form of ridges. However, those skilled in the art could understand that the left guide rail and the right guide rail may also be configured with other structures or forms, for example, the left guide rail and the right guide rail may be structures having hollow/solid portions as long as blocks can be guided by outer edges thereof; and the present utility model is not limited thereto.

In the embodiments of the present utility model, one or more of the lower cover 12, the spacer 132, the left guide rail 151, the right guide rail 152, the left flip cover 141, and the right flip cover 142 may be independent components. Alternatively, the lower cover 12, the spacer 132, the left guide rail 151, the right guide rail 152, the left flip cover 141, and the right flip cover 142 may be integrally formed. In addition, those skilled in the art could understand that any material meeting environmental protection and food/pharmaceutical standards can be used in processing any one of the cover, the spacer, the guide rail, and the flip cover, and the material includes, but is not limited to, metal, plastic, a paper product, etc.

In the embodiments of the present utility model, one of the upper cover and the lower cover may further be provided with a plurality of first positioning columns, and the other of the upper cover and the lower cover may be provided with a plurality of corresponding second positioning columns. The upper cover and the lower cover are combined by means of the plurality of first positioning columns and the plurality of second positioning columns. Specifically, as shown in FIG. 4, a plurality of first positioning columns 161, 162, 163, and 164 are respectively provided near four corners of the upper cover 11. As shown in FIG. 5, a plurality of second positioning columns 171, 172, 173, and 174 are respectively provided near four corners of the lower cover 12. The positions of the plurality of first positioning columns 161, 162, 163, and 164 correspond to the positions and sizes of the plurality of second positioning columns 171, 172, 173, and 174, respectively, and the plurality of first positioning columns 161, 162, 163, and 164 are adapted to be inserted into the plurality of second positioning columns 171, 172, 173, and 174 so as to facilitate combination between the upper cover 11 and the lower cover 12. Preferably, the spacer 131 of the upper cover 11 may further be provided with a first positioning column 165. Correspondingly, the spacer 132 of the lower cover 12 may further be provided with a second positioning column 175 so as to further facilitate combination between the upper cover 11 and the lower cover 12.

Figure 7:
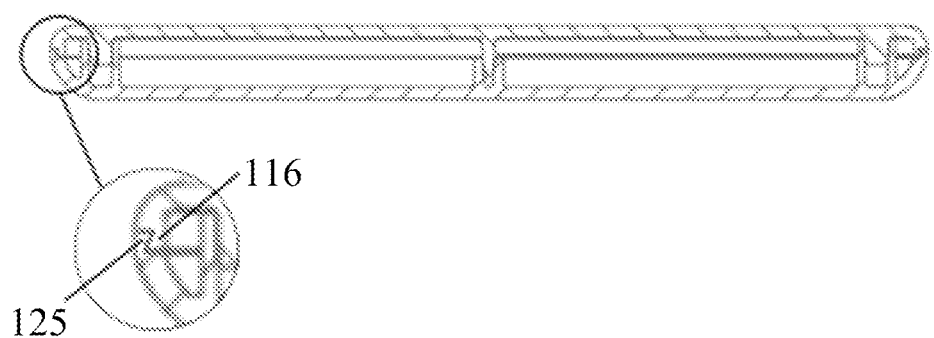
FIG. 7 is a cross-sectional view taken along line A-A in FIG. 1.

In the embodiments of the present utility model, a side of the lower cover 12 has rounded corners in portions other than the lower notch, thereby improving comfort of a user during a holding operation. Refer to FIG. 7, which is a cross-sectional view taken along line A-A in FIG. 1. In the embodiment shown in FIG. 7, in addition to that the side of the lower cover 12 has rounded corners in portions other than the lower notch, a side of the upper cover 11 has rounded corners in portions other than the upper notch. The side of the upper cover 11 has an upper rounded corner radius in the portions other than the upper notch. The side of the lower cover 12 has a lower rounded corner radius in the portions other than the lower notch. As shown in FIG. 7, the lower rounded corner radius is greater than the upper rounded corner radius, so that the rounded corner of the lower cover 12 is larger than the rounded corner of the upper cover 11, thereby further improving comfort of the user during a holding operation. In some embodiments, the lower cover 12 may have a height substantially identical to the lower rounded corner radius, and the upper cover 11 may have a height substantially identical to the upper rounded corner radius. In the embodiments shown in the present utility model, description is provided on the basis that both the side of the upper cover and the side of the lower cover have rounded corners. However, those skilled in the art could understand that it is possible that the side of the lower cover has a rounded corner but the side of the upper cover does not have a rounded corner (for example, may have a square corner), and the present utility model is not limited thereto.

According to the embodiments of the present utility model, as shown in FIG. 7, an upper dovetail structure 116 is formed on a side edge of the upper cover 11 in portions other than the upper notch. A lower dovetail structure 125 is formed on a side edge of the lower cover 12 in portions other than the lower notch. The upper dovetail structure 116 is shown as a protruding dovetail structure, and the lower dovetail structure 125 is shown as a recessed dovetail structure. The upper dovetail structure 116 and the lower dovetail structure 125 are configured to be engageable with each other so as to combine the upper cover 11 with the lower cover 12. This combination method is convenient and facilitates a firm connection. Certainly, those skilled in the art could understand that combining the upper cover with the lower cover is not limited to using the dovetail structure, and any other suitable method that can combine the upper cover with the lower cover falls within the protection scope of the present utility model.

In the technical solutions of the present utility model, a spacer is provided in a packaging box, so that the internal packaging space of the packaging box is divided into a plurality of cavities, thereby allowing various types of blocks to be stored in one packaging box and greatly improving use experience of the consumer. Furthermore, the rounded corner of the lower cover of the packaging box is configured to be greater than the rounded corner of the upper cover of the packaging box, so that the consumer can easily hold the packaging box with one hand. Moreover, by means of the design allowing the flip cover to be flipped vertically, the consumer could easily access products in the packaging box with one hand, thereby expanding application scenarios of the packaging box.

Although the exemplary embodiments have been described in detail above, the embodiments disclosed are exemplary only and are not limiting, and those skilled in the art could readily appreciate that many other modifications, changes, and/or substitutions are possible in the exemplary embodiments without substantially departing from the novel teachings and advantages of the present disclosure. Therefore, all of these modifications, changes, and/or substitutions are intended to be included within the scope of the present disclosure as defined in the appended claims.

The invention claimed is:

1. A packaging box defining a first axis, a second axis perpendicular to the first axis, and a third axis perpendicular to the first axis and the second axis, the packaging box comprising:
   an upper cover;
   a lower cover, wherein the upper cover and the lower cover can be combined together along the third axis to form an internal packaging space therebetween; and
   at least one spacer provided in the interior of at least one of the upper cover and the lower cover extending along the second axis;
   wherein, when the upper cover and the lower cover are combined, the spacer divides the internal packaging space into at least a left cavity and a right cavity;
   wherein the packaging box comprises opposing front and rear walls extending along the first axis, and opposing right and left walls extending along the second axis, the front and rear walls being longer than the right and left walls,
   wherein the left cavity and the right cavity have a left outlet and a right outlet formed on the front wall, respectively, and at least one of the upper cover and the lower cover is provided with at least one flip cover;
   wherein the at least one flip cover can be flipped vertically to close or open the left outlet and/or the right outlet;
   wherein a gradually inclined left guide rail is arranged within the left cavity and extends from the left wall to the front wall;
   wherein a gradually inclined right guide rail is arranged within the right cavity and extends from the right wall to the front wall; and
   wherein each of the right guide rail and the left guide rail forms an angle of less than 45 degrees with the front wall.

2. The packaging box according to claim 1, wherein the spacer is a ridge provided at a position in the interior of at least one of the upper cover and the lower cover, and when the upper cover and the lower cover are combined, the ridge divides the internal packaging space into the left cavity and the right cavity.

3. The packaging box according to claim 1, wherein the packaging box is a rectangular box, and the upper cover and the lower cover respectively have a pair of parallel long edges and a pair of parallel short edges perpendicular to the pair of parallel long edges.

4. The packaging box according to claim 3, wherein the spacer is a straight ridge provided at a position in the interior of at least one of the upper cover and the lower cover; the ridge is parallel to the short edges; and when the upper cover and the lower cover are combined, the ridge divides the internal packaging space into the left cavity and the right cavity.

5. The packaging box according to claim 4, wherein the spacer is a straight ridge provided at a middle position in the interior of at least one of the upper cover and the lower cover, and when the upper cover and the lower cover are combined, the ridge divides the internal packaging space into the left cavity and the right cavity having identical sizes.

6. The packaging box according to claim 1, wherein the left outlet and the right outlet have identical or different shapes.

7. The packaging box according to claim 1, wherein the left outlet and the right outlet have identical or different sizes.

8. The packaging box according to claim 1, wherein the at least one flip cover is one flip cover; the one flip cover simultaneously closes or opens the left outlet and the right outlet; and the one flip cover is provided on one of the upper cover and the lower cover.

9. The packaging box according to claim 1, wherein the at least one flip cover comprises two flip covers; the two flip covers close or open the left outlet and the right outlet, respectively; and the two flip covers are provided on one of the upper cover and the lower cover or are provided on the upper cover and the lower cover, respectively.

10. The packaging box according to claim 1, wherein the at least one flip cover is connected by a hinge to at least one of the upper cover and the lower cover.

11. The packaging box according to claim 1, wherein the packaging box includes both the left guide rail and the right guide rail, the left guide rail extending from a left edge of the left outlet to the left edge of the one of the upper cover and the lower cover and the right guide rail extending from a right edge of the right outlet to the right edge of the one of the upper cover and the lower cover.

12. The packaging box according to claim 11, wherein either one of the left guide rail and the right guide rail is provided on at least one of the upper cover and the lower cover.

13. The packaging box according to claim 11, wherein the lower cover, the spacer, the left guide rail, the right guide rail, and the flip cover are integrally formed.

14. The packaging box according to claim 1, wherein the lower cover has a height greater than that of the upper cover.

15. The packaging box according to claim 1, wherein the left outlet and the right outlet are adjacent to each other.

16. The packaging box according to claim 1, wherein the left outlet and the right outlet are provided on a side edge of the packaging box.

17. The packaging box according to claim 1, wherein the packaging box is flat.

18. The packaging box according to claim 17, wherein an outer surface of at least one of the upper cover and the lower cover is provided with a recess; a free end of the at least one flip cover is provided with a protruding portion; and the protruding portion is configured to be engageable with a side of the recess such that the at least one flip cover closes the left outlet and the right outlet.

19. The packaging box according to claim 17, wherein a side edge of the upper cover is provided with an upper dovetail structure; a side edge of the lower cover is provided with a lower dovetail structure; and the upper dovetail structure and the lower dovetail structure are configured to be engageable with each other so as to combine the upper cover with the lower cover.

20. The packaging box according to claim 19, wherein one of the upper dovetail structure and the lower dovetail structure is a protruding dovetail structure, and the other of the upper dovetail structure and the lower dovetail structure is a recessed dovetail structure.

21. A packaging box, comprising:
an upper cover;
a lower cover, wherein the upper cover and the lower cover can be combined together to form an internal packaging space therebetween; and
at least one spacer provided in the interior of at least one of the upper cover and the lower cover;
wherein, when the upper cover and the lower cover are combined, the spacer divides the internal packaging space into at least a left cavity and a right cavity;
wherein the left cavity and the right cavity have a left outlet and a right outlet, respectively, and at least one of the upper cover and the lower cover is provided with at least one flip cover; and
wherein the at least one flip cover can be flipped vertically to close or open the left outlet and/or the right outlet;
wherein the packaging box comprises at least one of a gradually inclined left guide rail arranged within the left cavity and a gradually inclined right guide rail arranged within the right cavity, the left guide rail extending to a left edge of one of the upper cover and the lower cover and the gradually inclined right guide rail extending to a right edge of one of the upper cover and the lower cover;
wherein the packaging box is a rectangular box, and the upper cover and the lower cover respectively have a pair of parallel long edges and a pair of parallel short edges perpendicular to the pair of parallel long edges;
wherein the spacer is a straight ridge provided at a position in the interior of at least one of the upper cover and the lower cover;
wherein the ridge is parallel to the short edges;
wherein, when the upper cover and the lower cover are combined, the ridge divides the internal packaging space into the left cavity and the right cavity;
wherein a portion of a long edge on a side of the upper cover comprising an end of the ridge is provided with an upper notch, and a position on the lower cover corresponding to the upper notch of the upper cover is provided with a lower notch; and
wherein, when the upper cover and the lower cover are combined, the upper notch of the upper cover, the lower notch of the lower cover, and the ridge together form the left outlet of the left cavity and the right outlet of the right cavity.

\* \* \* \* \*